United States Patent
Do et al.

(10) Patent No.: US 9,832,161 B2
(45) Date of Patent: Nov. 28, 2017

(54) SYSTEM AND METHOD FOR SOCIAL AWARENESS TEXTILES

(71) Applicant: INTERNATIONAL BUSINESS MACHINES CORPORATION, Armonk, NY (US)

(72) Inventors: Lydia M. Do, Durham, NC (US); Jenny S. Li, Danbury, CT (US); Pamela A. Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/982,799

(22) Filed: Dec. 29, 2015

(65) Prior Publication Data

US 2017/0187669 A1    Jun. 29, 2017

(51) Int. Cl.
*G06F 15/16* (2006.01)
*H04L 12/58* (2006.01)
*G06F 17/30* (2006.01)

(52) U.S. Cl.
CPC ........ *H04L 51/32* (2013.01); *G06F 17/30867* (2013.01)

(58) Field of Classification Search
CPC ........ A41D 1/002; A41D 1/005; G08B 21/18; G08B 13/2445; G06F 1/163; G06K 19/07; G06Q 30/0645; H04R 5/023; H04R 2201/023
USPC ........................................................ 709/206
See application file for complete search history.

(56) References Cited

U.S. PATENT DOCUMENTS

| 6,711,414 | B1 | 3/2004 | Lightman et al. | |
|---|---|---|---|---|
| 6,801,140 | B2 | 10/2004 | Mantyjarvi et al. | |
| 9,070,171 | B2* | 6/2015 | Guo | G06T 11/60 |
| 2008/0297878 | A1* | 12/2008 | Brown | B82Y 10/00 |
| | | | | 359/263 |
| 2015/0145671 | A1* | 5/2015 | Cohen | G08B 21/18 |
| | | | | 340/539.11 |
| 2015/0186419 | A1* | 7/2015 | Agrawal | G06F 17/30265 |
| | | | | 707/722 |
| 2015/0199566 | A1* | 7/2015 | Moore | G06K 9/00442 |
| | | | | 348/47 |

OTHER PUBLICATIONS http://gigaom.com/2013/12/14/why-the-wearable-explosion-is-driving-tech-and-fashion-convergence, Bertone, et al., "Why the wearable explostion is driving tech and fashion convergence", (Dec. 14, 2013), 4 pages.
http://www.wired.co.uk/news/archive/2013-05/20/fashion-and-technology, Clark, Liat, "Why wearable tech needs fashion to survuve and to thrive", (May 20, 2013), 13 pages.
http://www.gotmydress.net, (downloaded Aug. 26, 2015), 10 pages.
http://gigaom.com/2013/12/04/broadcoms-new-bluetooth-chip-includes-wireless-charging-for-wearables, Tofel, Kevin C., "Broadcom's new Bluetooth chip includes wireless charging for wearables", (Dec. 4, 2013), 1 page.

\* cited by examiner

*Primary Examiner* — Joseph Greene
(74) *Attorney, Agent, or Firm* — Brian J. Colandreo, Esq.; Jeffrey T. Placker, Esq.; Holland & Knight LLP (57) ABSTRACT

A method, computer program product, and computer system for identifying attribute information of at least a first wearable associated with an outfit of a user. Information about an event may be received. An electronic message may be sent about whether at least a portion of the outfit is recommended for wearing at the event based upon, at least in part, the attribute information of at least the first wearable and the information about the event.

14 Claims, 6 Drawing Sheets

SYSTEM AND METHOD FOR SOCIAL AWARENESS TEXTILES

BACKGROUND

Dressing for an event (e.g., an evening out, party, social gathering, etc.) may involve determining the appropriate attire. For example, one may be concerned that one may be more or less dressed up than other attendees at the event or than the event warrants. As another example, it may be possible that multiple attendees may be wearing the same thing, especially if one shops at the same stores as one of the attendees.

BRIEF SUMMARY OF DISCLOSURE

In one example implementation, a method, performed by one or more computing devices, may include but is not limited to identifying attribute information of at least a first wearable associated with an outfit of a user. Information about an event may be received. An electronic message may be sent about whether at least a portion of the outfit is recommended for wearing at the event based upon, at least in part, the attribute information of at least the first wearable and the information about the event.

One or more of the following example features may be included. The first wearable may be a master arbiter. Identifying the attribute information of at least the first wearable associated with the outfit of the user may include receiving, by the first wearable, additional attribute information from at least a second wearable associated with the outfit of the user. The information about the event may be received from a social media website. The information about the event may be received from a scheduling application. The information about the event may include an indication of an attendee of the event wearing at least the portion of the outfit. The information about the event may include an indication of an attendee of the event that was an attendee of a previous event where at least the portion of the outfit was worn by the user at the previous event.

In another example implementation, a computing system includes a processor and a memory configured to perform operations that may include but are not limited to identifying attribute information of at least a first wearable associated with an outfit of a user. Information about an event may be received. An electronic message may be sent about whether at least a portion of the outfit is recommended for wearing at the event based upon, at least in part, the attribute information of at least the first wearable and the information about the event.

One or more of the following example features may be included. The first wearable may be a master arbiter. Identifying the attribute information of at least the first wearable associated with the outfit of the user may include receiving, by the first wearable, additional attribute information from at least a second wearable associated with the outfit of the user. The information about the event may be received from a social media website. The information about the event may be received from a scheduling application. The information about the event may include an indication of an attendee of the event wearing at least the portion of the outfit. The information about the event may include an indication of an attendee of the event that was an attendee of a previous event where at least the portion of the outfit was worn by the user at the previous event.

In another example implementation, a computer program product resides on a computer readable storage medium that has a plurality of instructions stored on it. When executed by a processor, the instructions cause the processor to perform operations that may include but are not limited to identifying attribute information of at least a first wearable associated with an outfit of a user. Information about an event may be received. An electronic message may be sent about whether at least a portion of the outfit is recommended for wearing at the event based upon, at least in part, the attribute information of at least the first wearable and the information about the event.

One or more of the following example features may be included. The first wearable may be a master arbiter. Identifying the attribute information of at least the first wearable associated with the outfit of the user may include receiving, by the first wearable, additional attribute information from at least a second wearable associated with the outfit of the user. The information about the event may be received from a social media website. The information about the event may be received from a scheduling application. The information about the event may include an indication of an attendee of the event wearing at least the portion of the outfit. The information about the event may include an indication of an attendee of the event that was an attendee of a previous event where at least the portion of the outfit was worn by the user at the previous event.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
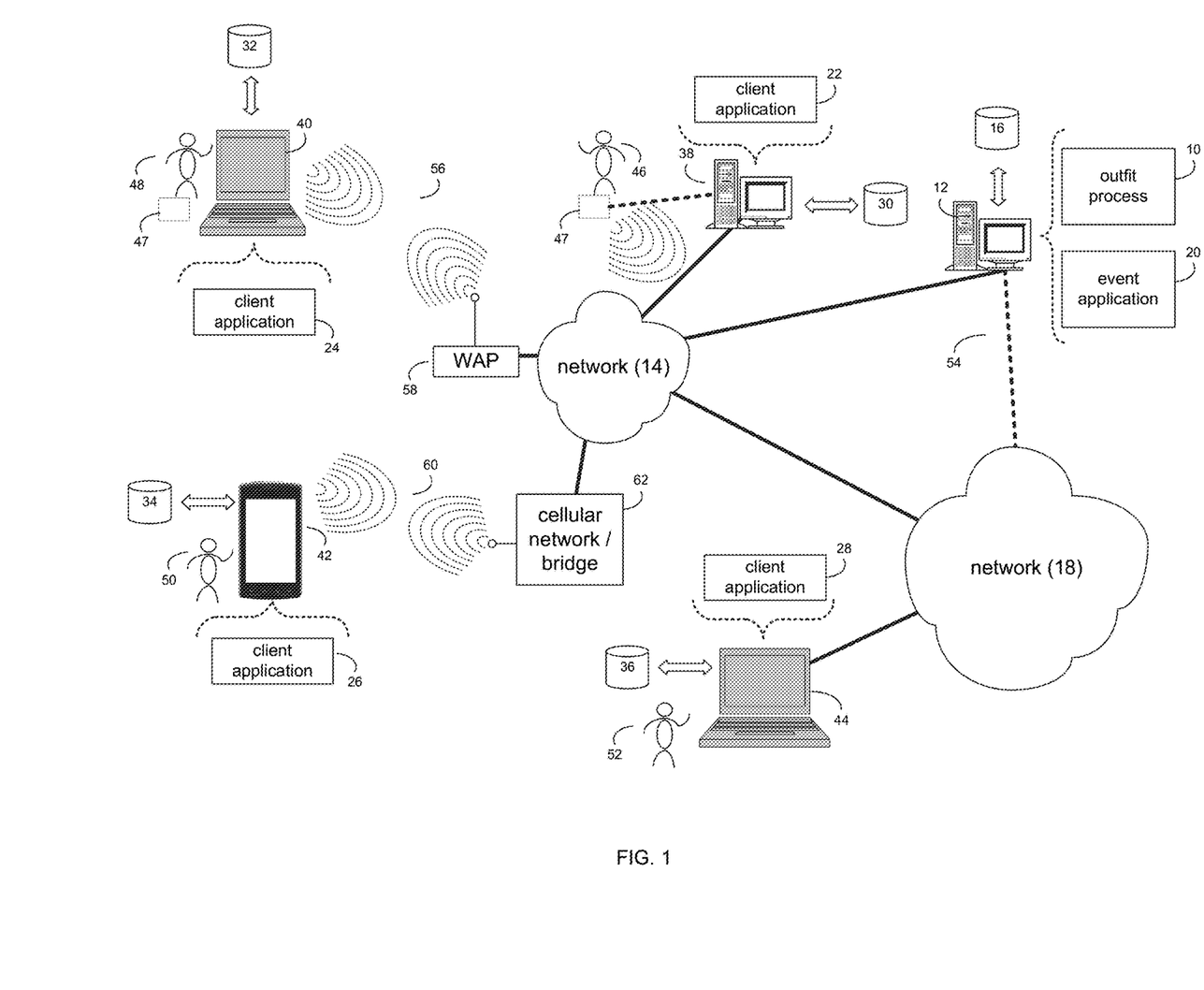
FIG. 1 is an example diagrammatic view of an outfit process coupled to a distributed computing network according to one or more example implementations of the disclosure.

Referring now to FIG. 1, there is shown outfit process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, outfit process 10 may identify attribute information of at least a first wearable associated with an outfit of a user. Information about an event may be received. An electronic message may be sent about whether at least a portion of the outfit is recommended for wearing at the event based upon, at least in part, the attribute information of at least the first wearable and the information about the event.

The instruction sets and subroutines of outfit process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. Outfit process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute an event application (e.g., event application 20), examples of which may include, but are not limited to, e.g., a scheduling application, a calendar application, a social media application, a fashion application, a web conferencing application, a video conferencing application, a voice-over-IP application, a video-over-IP application, an Instant Messaging (IM)/"chat" application, a short messaging service (SMS)/multimedia messaging service (MMS) application, or other application that allows for entering, receiving, or identifying details of an event. Outfit process 10 and/or event application 20 may be accessed via client applications 22, 24, 26, 28. Outfit process 10 may be a standalone application, or may be an applet/application/script/extension that may interact with and/or be executed within event application 20, a component of event application 20, and/or one or more of client applications 22, 24, 26, 28. Event application 20 may be a standalone application, or may be an applet/application/script/extension that may interact with and/or be executed within outfit process 10, a component of outfit process 10, and/or one or more of client applications 22, 24, 26, 28. One or more of client applications 22, 24, 26, 28 may be a standalone application, or may be an applet/application/script/extension that may interact with and/or be executed within and/or be a component of outfit process 10 and/or event application 20. Examples of client applications 22, 24, 26, 28 may include, but are not limited to, e.g., a scheduling application, a calendar application, a social media application, a fashion application, a web conferencing application, a video conferencing application, a voice-over-IP application, a video-over-IP application, an Instant Messaging (IM)/"chat" application, a short messaging service (SMS)/multimedia messaging service (MMS) application, or other application that allows for entering, receiving, or identifying details of an event, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of outfit process 10 (and vice versa). Accordingly, outfit process 10 may be a purely server-side application, a purely client-side application, or a hybrid server-side/client-side application that is cooperatively executed by one or more of client applications 22, 24, 26, 28 and/or outfit process 10.

One or more of client applications 22, 24, 26, 28 may be configured to effectuate some or all of the functionality of event application 20 (and vice versa). Accordingly, event application 20 may be a purely server-side application, a purely client-side application, or a hybrid server-side/client-side application that is cooperatively executed by one or more of client applications 22, 24, 26, 28 and/or event application 20. As one or more of client applications 22, 24, 26, 28, outfit process 10, and event application 20, taken singly or in any combination, may effectuate some or all of the same functionality, any description of effectuating such functionality via one or more of client applications 22, 24, 26, 28, outfit process 10, event application 20, or combination thereof, and any described interaction(s) between one or more of client applications 22, 24, 26, 28, outfit process 10, event application 20, or combination thereof to effectuate such functionality, should be taken as an example only and not to limit the scope of the disclosure.

Users 46, 48, 50, 52 may access computer 12 and outfit process 10 (e.g., using one or more of client electronic devices 38, 40, 42, 44) directly through network 14 or through secondary network 18. Further, computer 12 may be connected to network 14 through secondary network 18, as illustrated with phantom link line 54. Outfit process 10 may include one or more user interfaces, such as browsers and textual or graphical user interfaces, through which users 46, 48, 50, 52 may access outfit process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices (e.g., "wearable" 47) to be interconnected using a short-range wireless connection. Other forms of interconnection (e.g., Near Field Communication (NFC)) may also be used.

Figure 2:
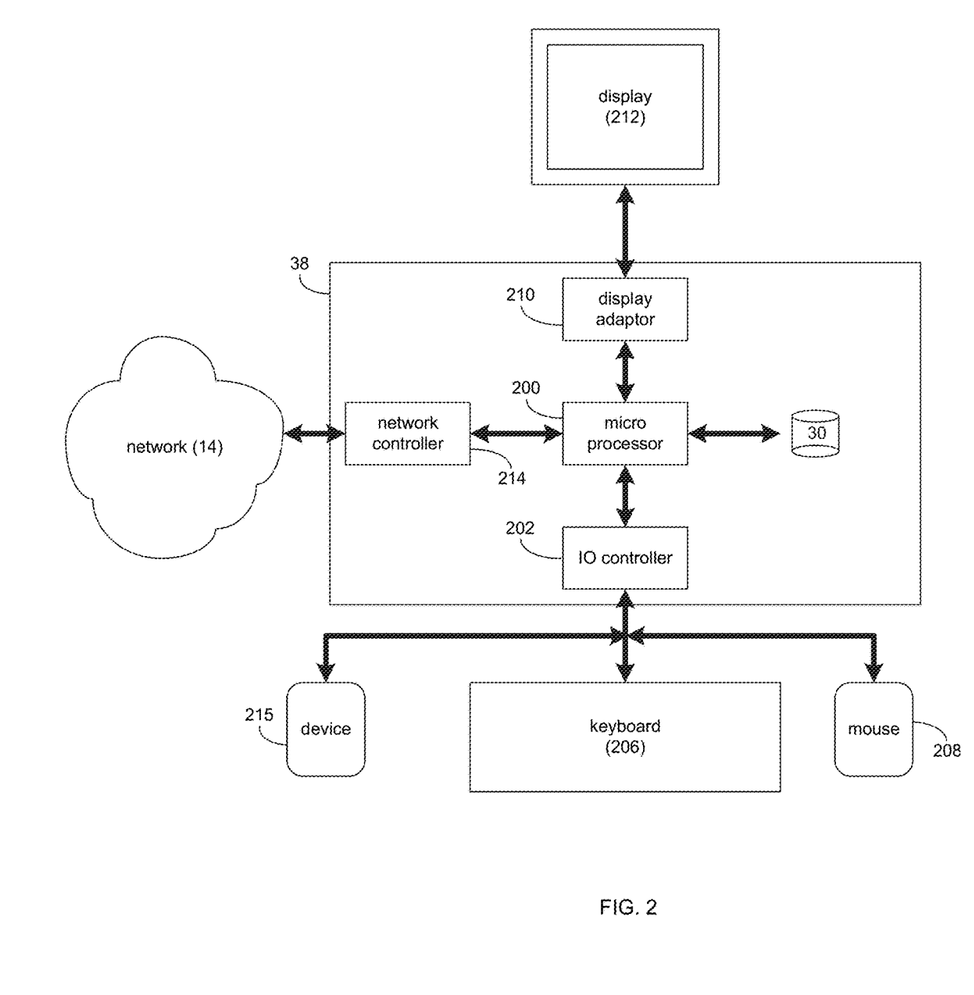
FIG. 2 is an example diagrammatic view of a client electronic device of FIG. 1 according to one or more example implementations of the disclosure.

Referring also to FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, outfit process 10 (including a "wearable" 47) may be substituted for client electronic device 38 (in whole or in part) within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

The Outfit Process:

As discussed above and referring also at least to FIGS. 3-6, outfit process 10 may identify 300 attribute information of at least a first wearable associated with an outfit of a user. Information about an event may be received 302 by outfit process 10. Outfit process 10 may send 304 an electronic message about whether at least a portion of the outfit is recommended for wearing at the event based upon, at least in part, the attribute information of at least the first wearable and the information about the event.

As noted above, dressing for an event (e.g., an evening out, party, social gathering, etc.) may involve determining the appropriate attire. For example, one may be concerned that one may be more or less dressed up than other attendees at the event. As another example, it may be possible that multiple attendees may be wearing the same thing, especially if one shops at the same stores as one of the attendees. Additionally, people that may have close relationships, such as friends, family, or co-workers, may have similar taste in outfit selection. Multitudes of other fashion issues may be prevalent as well. For example, appropriate attire in, e.g., Miami, during, e.g., June, for an upscale event may be different from what is considered appropriate attire in, e.g., New York for a similarly (or differently) timed event. Appropriate attire may also be defined by, e.g., age-appropriate attire, changing fashion trends, and clothes that portray the appropriate message about how a person may wish to be perceived, all of which may be difficult to master, as well as stay informed on and may add additional difficulty to the issues mentioned previously.

As will be discussed in greater detail, outfit process 10 may be implemented, at least in part, as "smart clothes". For example, outfit process 10 may be based on wearable devices/intelligent textiles, that may communicate with one or more other wearables to provide information and/or recommendations (e.g., in real-time) to the wearer. As will also be discussed in greater detail, one or more primary wearable devices (e.g., an arbiter) may be enabled (e.g., via outfit process 10) to communicate with scheduling, social media and/or other internet accessible sites to obtain event information. The primary wearable may (e.g., via outfit process 10) obtain information from one or more other intelligent wearables (which may include types of clothing or other textiles, shoes, accessories such as jewelry, hats, sunglasses, glasses, etc.) that may identify attribute information about the wearable and/or what it may look like (e.g., make, model, condition, material, color/pattern, type of wearable, brand, matching/non-matching potential colors, warmth offering, attractiveness rating, expense/cost of the wearable, etc.). This attribute information may be available to the other wearables or any other computing devices. In the example, the wearable(s) may include logic via outfit process 10 around color matches, appropriate dress for occasions, favorite outfits, etc. based upon, at least in part, the attribute information and/or information associated with a scheduled event.

As will also be described below, outfit process 10 may be implemented as one or more personal "wearables" that may interact with one or more other wearables, provide dressing insight based on, at least in part, for example, an understanding of a person's wardrobe, their social circle, their calendar and status, certain social norms for dressing (e.g., via outfit process 10 as programmed by the user and/or by examining social norms for the geographic region, the climate, the class of people at the event, the current trends, etc.), and may enable provision of real-time advice and communication on appropriate and socially material wardrobe choices. As such, outfit process 10 may, for example, provide appropriate choices for an ensemble/outfit, provide appropriate choices for at least a portion of the outfit given what one's social circle is wearing, provide appropriate choices for at least a portion of the outfit given other constraints such as but not limited to, weather, venue, etc.

In some implementations, a "wearable" (a.k.a. "smart clothing") may generally be described as a computing device embedded, woven (or otherwise integrated) in an article/portion of an outfit (e.g., clothing or other textiles, shoes, accessories such as jewelry, hats, sunglasses, glasses, etc.) to be worn by a user. In some implementations, as will be discussed below, the wearable(s) (e.g., via outfit process 10) may be "self-aware" of its attributes (e.g., make, model, condition, material, color/pattern, type of wearable, brand, matching/non-matching potential colors, warmth offering, attractiveness rating, expense/cost of the wearable, etc.), may be internet (or any of the above-noted communication type) enabled to identify information such as, e.g., current time, weather, information about an event, social media connections, etc.), and may be enabled to arbitrate with the other wearables in order to determine a leader.

In some implementations, outfit process 10 may identify 300 attribute information of at least a first wearable associated with an outfit of a user. For instance, and referring at least to FIG. 4, assume a user (e.g., user 46) has decided to attend an event. In the example, further assume that user 46 selects a dress (e.g., dress 400) as an option to be worn to the event. In the example, dress 400 may be considered a wearable (e.g., wearable 47) as described above. Further in the example, in some implementations, dress 400 may (e.g., via outfit process 10) be "self-aware" of its attribute information (e.g., make, model, condition, material, color/pattern, type of wearable, brand, matching/non-matching potential colors, warmth offering, attractiveness rating, expense/cost of the wearable, etc.) and may identify 300 at least a portion of the attribute information. In some implementations, the identified 300 attribute information may be pre-stored on a storage device of wearable 47 (not shown), or retrieved from a data store that includes the attribute information. In some implementations, updates to the attributes (e.g., via the data store entry associated with wearable 47) may be obtained. For instance, the attractiveness rating (e.g., a subjective rating of how attractive dress 400 may be) may be, e.g., an 8 out of 10 when originally purchased, but may decrease to a 5 out of 10 as, e.g., dress 400 goes out of style. In the example, the attribute information for the attractiveness rating may be updated from an 8 to a 5. In some implementations, a user interface (not shown) associated with outfit process 10 may enable user 46 (e.g., via client electronic device 38) to input the attribute information as well as any other desired attribute information to be uploaded to wearable 47.

Figure 3:
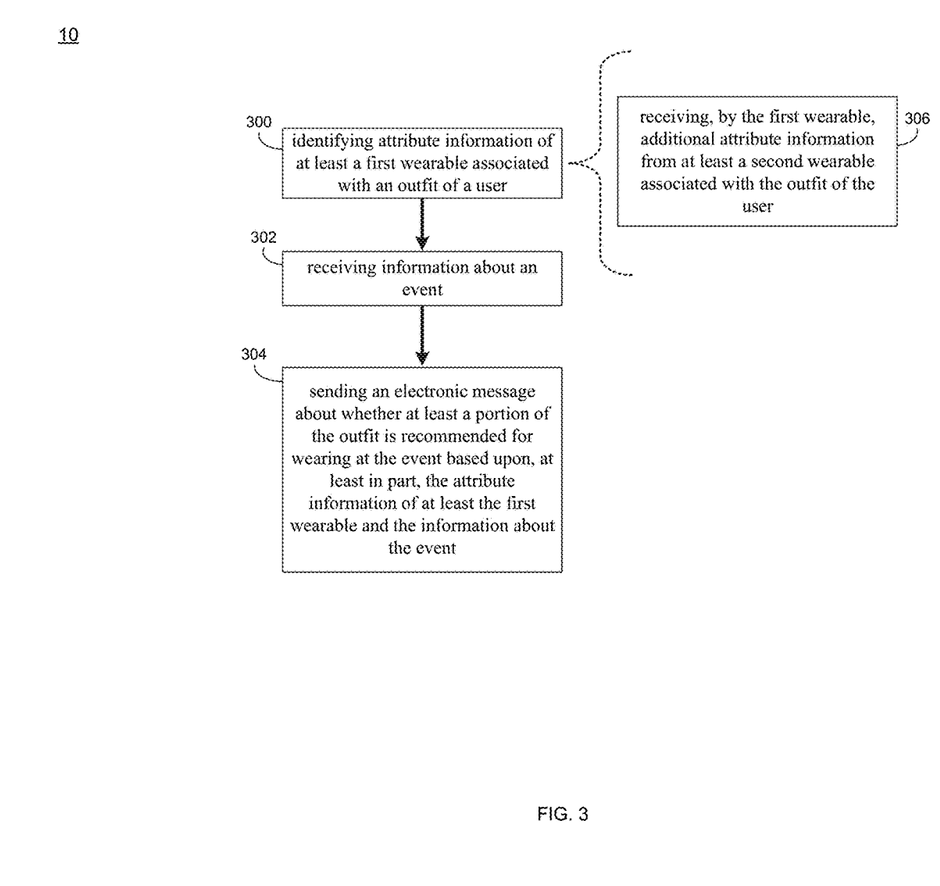
FIG. 3 is an example flowchart of the outfit process of FIG. 1 according to one or more example implementations of the disclosure.

In some implementations, information about an event may be received 302 by outfit process 10. For instance, information about an event may include, e.g., time and date of the event, location of the event, current/estimated temperature and weather conditions, whether the event is inside or outside, formal nature of event (e.g., casual, business casual, formal, black tie, etc.), crime rate of the event location, attendees of the event, as well as other information that may be gleaned by outfit process 10 from searching the Internet about the event. In some implementations, a user interface (not shown) associated with outfit process 10 may enable user 46 (e.g., via client electronic device 38) to input at least a portion of the event information as well as any other desired attribute information to be uploaded to wearable 47. For instance, user 46 may enter the event manually, as well as any other acquaintances that are known to be attending the event. In some implementations, the information about the event may be received 302 from a social media website. For example, assume that user 46 is a member of a known social media website with the listed event. In the example, the event and its associated information may be visible to user 46 (e.g., via outfit process 10) and received 302 if, e.g., user 46 has created the event, user 46 has been invited to the event via the social media website, the event is published for public viewing, etc.

In some implementations, the information about the event may be received 302 from a scheduling application. For example, a scheduling application (e.g., calendar application) associated with outfit process 10 may include an entry of the event and its associated information. The event and its associated information may be visible to user 46 (e.g., via outfit process 10) and received 302 if, e.g., user 46 has created the event entry in the scheduling application, user 46 has been invited to the event via the scheduling application, the event is published for public viewing via the scheduling application, etc. The various other examples of event information may be received 302 from the appropriate data stores. For example, the crime rate may be received 302 via a national crime data store. In some implementations, some or all of the event information may be received 302 and culminated via a single data store after being gathered from multiple data stores. It will be appreciated that any method of obtaining the appropriate event information (as well as the above-noted attribute information) may be used without departing from the scope of the disclosure.

Figure 4:
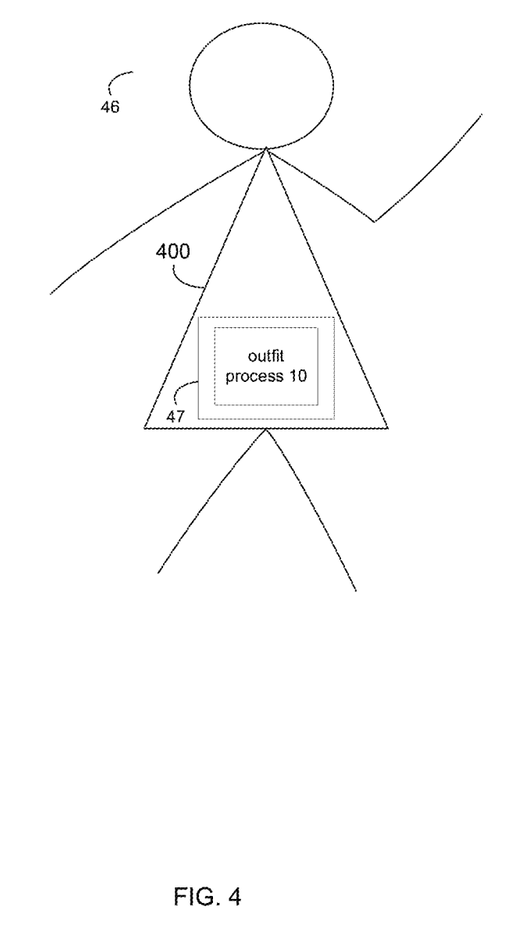
FIG. 4 is an example diagrammatic view of a wearable according to one or more example implementations of the disclosure.

In some implementations, outfit process 10 may send 304 an electronic message about whether at least a portion of the outfit is recommended for wearing at the event based upon, at least in part, the attribute information of at least the first wearable and the information about the event. For instance, assume for example purposes only that user 46 is scheduled (e.g., via the scheduling application, social media website, etc.) to attend an event, labeled as Event X. In the example, further assume that outfit process 10 receives 302 information about Event X labeling it as a casual event. Further assume in the example that user 46 desires to wear dress 400 to Event X, and that attribute information associated with dress 400 is identified 300 as a formal dress. Thus, in the example, since dress 400 is a formal dress, and Event X is a casual event, outfit process 10 may determine that user 46 will be overdressed if dress 400 is worn to Event X, and may send 304 user 46 (e.g., via text, email, display on a client electronic device, etc.) an electronic message that at least a portion of the outfit (e.g., dress 400) is not recommended for wearing at the event. It will be appreciated that any number of varying attribute information, any number of varying event information, and combinations thereof, may be used to send 304 the above-noted recommendation without departing from the scope of the disclosure. As such, the description of using a single attribute information and a single event information should be taken as example only and not to limit the scope of the disclosure.

As another example, assume for example purposes only that user 46 is scheduled (e.g., via the scheduling application, social media website, etc.) to attend an event, labeled as Event Y. In the example, further assume that outfit process 10 receives 302 information about Event Y labeling it as a formal event. Further assume in the example that user 46 desires to wear dress 400 to Event Y, and that attribute information associated with dress 400 is identified 300 as a formal dress. Thus, in the example, since dress 400 is a formal dress, and Event Y is a formal event, outfit process 10 may determine that user 46 will not be overdressed if dress 400 is worn to Event Y, and may send 304 user 46 (e.g., via text, email, display on a client electronic device, etc.) an electronic message that at least a portion of the outfit (e.g., dress 400) is recommended (e.g., appropriate) for wearing at the event. Other examples of recommendations (e.g., comments, hints, concerns, etc.) may be used without departing from the scope of the disclosure.

In some implementations, identifying 300 the attribute information of at least the first wearable associated with the outfit of the user may include outfit process 10 receiving 306, by the first wearable, additional attribute information from at least a second wearable associated with the outfit of the user. For example, in some implementations, a plurality of wearables may be used to make outfit recommendations. For instance, and referring at least to FIG. 5, further assume that user 46 selects dress 400 (e.g., the first wearable) and selects shoes (e.g., shoes 500) as an option to be worn to the event. In the example, shoes 500 may be considered a wearable (e.g., the second wearable, e.g., wearable 49) as described above. Further in the example, in some implementations, shoes 500 may (e.g., via outfit process 10) be "self-aware" of its attribute information (e.g., make, model, condition, material, color/pattern, type of wearable, brand, matching/non-matching potential colors, warmth offering, attractiveness rating, expense/cost of the wearable, etc.) and may identify 300 at least a portion of the attribute information. In some implementations, wearable 47 (e.g., via outfit process 10) may receive and identify 300 attribute information directly from wearable 49. In some implementations, wearable 47 (e.g., via outfit process 10) may receive and identify 300 attribute information indirectly from wearable 49. For example, wearable 49 may send its associated attribute information to another client electronic device for storage (e.g., client electronic device 38, computer 12, etc.), where wearable 47 may identify the attribute information via, e.g., client electronic device 38. Thus, in the examples, outfit process 10 may identify 300 attribute information from a plurality of wearables. It will be appreciated that any number of wearables may be used without departing from the scope of the disclosure.

Figure 5:
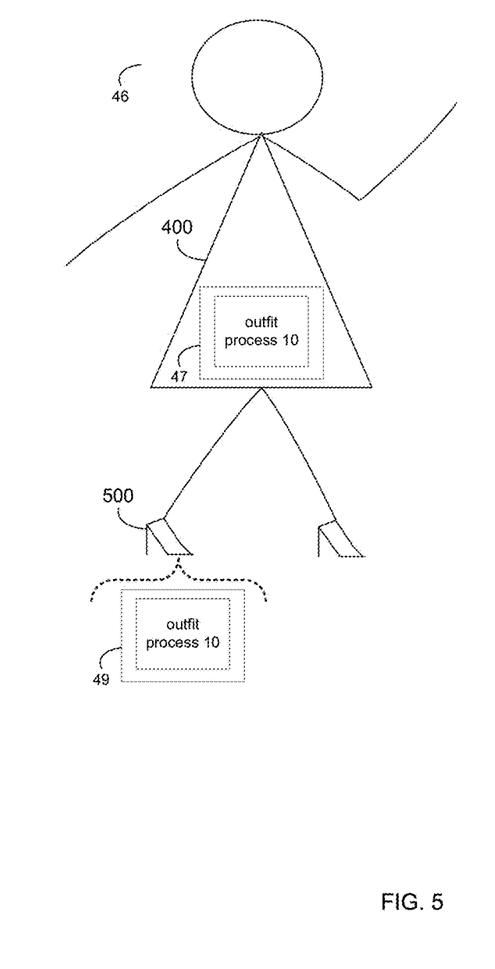
FIG. 5 is an example diagrammatic view of two wearables according to one or more example implementations of the disclosure.

Continuing with the above example, assume for example purposes only that user 46 is scheduled (e.g., via the scheduling application, social media website, etc.) to attend an event, labeled as Event X. In the example, further assume that outfit process 10 receives 302 information about Event X labeling it as a casual event. Further assume in the example that user 46 desires to wear dress 400 and shoes 500 to Event X, and that attribute information associated with dress 400 is identified 300 as a formal dress, and attribute information associated with shoes 500 is identified 300 as a casual shoe design. Thus, in the example, since dress 400 is considered formalwear, and shoes 500 are considered casualwear, and Event X is a casual event, outfit process 10 may determine that user 46 will be overdressed if dress 400 is worn to Event X, and may send 304 user 46 (e.g., via text, email, display on a client electronic device, etc.) an electronic message that at least a portion of the outfit (e.g., dress 400) is not recommended for wearing at the event, but that shoes 500 may be recommended (e.g., appropriate) for wearing at the event.

As another example, assume for example purposes only that user 46 is scheduled (e.g., via the scheduling application, social media website, etc.) to attend an event, labeled as Event Y. In the example, further assume that outfit process 10 receives 302 information about Event Y labeling it as a formal event. Further assume in the example that user 46 desires to wear dress 400 and shoes 500 to Event Y, and that attribute information associated with dress 400 is identified 300 as a formal dress, and attribute information associated with shoes 500 is identified 300 as a casual shoe design. Thus, in the example, since dress 400 is considered formalwear, and shoes 500 are considered casualwear, and Event Y is a formal event, outfit process 10 may determine that user 46 will be underdressed if shoes 500 are worn to Event Y, and may send 304 user 46 (e.g., via text, email, display on a client electronic device, etc.) an electronic message that at least a portion of the outfit (e.g., shoes 500) are not recommended for wearing at the event, but that dress 400 may be recommended (e.g., appropriate) for wearing at the event. Other examples of recommendations (e.g., comments, hints, concerns, etc.) may be used without departing from the scope of the disclosure.

In some implementations, the information about the event may include an indication of an attendee of the event wearing at least the portion of the outfit. For instance, and referring at least to FIG. 6, assume for example purposes only that another user (e.g., user 48) is scheduled to attend the same Event X as user 46. As noted above, this information may be available to outfit process 10 to be received 302 via, e.g., a social media website where user 48 has been invited and/or has accepted an invitation to attend Event X. Further assume that outfit process 10 receives 302 information about Event X that indicates user 48 is scheduled to attend Event X. Further assume in the example that user 46 desires to wear dress 400 and shoes 500 to Event X, and that user 48 desires to wear dress 600 and shoes 500 to Event X, where dress 400 is different than dress 600 and shoes 500 are the same. Thus, in the example, since both user 46 and 48 both desire to wear shoes 500, outfit process 10 may determine that user 46 may not want to wear the same shoes as user 48 to Event X, and may send 304 user 46 (e.g., via text, email, display on a client electronic device, etc.) an electronic message that at least a portion of the outfit (e.g., shoes 500) are not recommended for wearing at the event for that reason.

Figure 6:
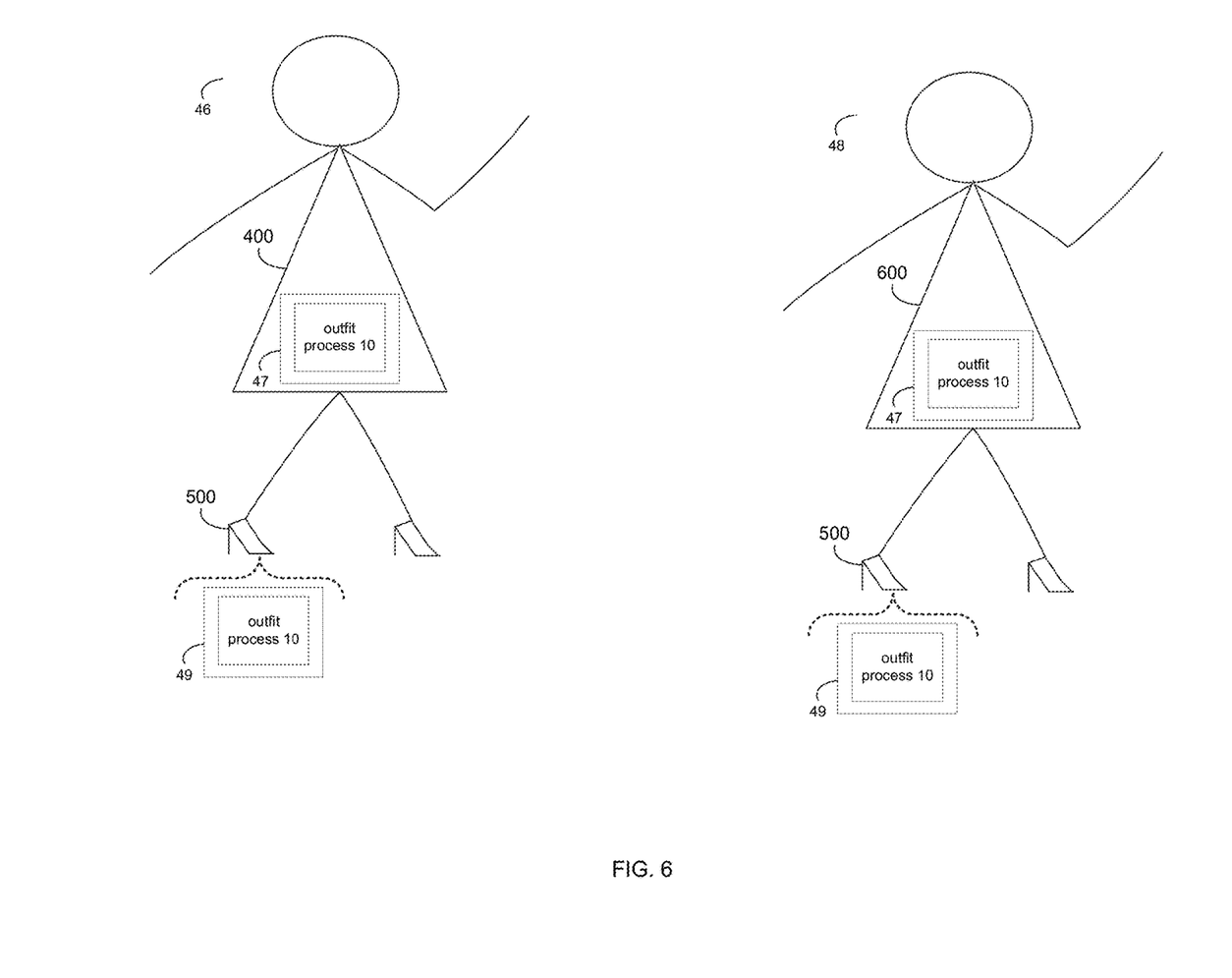
FIG. 6 is an example diagrammatic view of two users with wearables according to one or more example implementations of the disclosure.

It will be appreciated that the indication of user 48 wearing (or planning to wear) shoes 500 may occur at various times without departing from the scope of the disclosure. For instance, assume for example purposes only that user 46 is contemplating wearing shoes 500 to Event X. In some implementations, outfit process 10 may be aware that user 46 is contemplating wearing shoes 500 to Event X due to, e.g., temperature, pressure, or other biosensors as part of wearable 49 indicating shoes 500 are being worn, proximity/location sensors as part of wearable 49 indicating shoes 500 are not in their "storage location" (e.g., closet, shoe rack, shoe box, etc.), etc. In the example, further assume that outfit process 10 may similarly be aware that user 48 is contemplating wearing shoes 500 to Event X. In the example, outfit process 10 may determine that user 46 may not want to wear the same shoes as user 48 to Event X, and may send 304 user 46 (e.g., via text, email, display on a client electronic device, etc.) an electronic message that at least a portion of the outfit (e.g., are) is not recommended for wearing at the event since user 48 is also contemplating wearing shoes 500 to Event X.

As another example, and continuing with the above example where outfit process 10 may be aware that user 46 is contemplating wearing shoes 500 to Event X, outfit process 10 may similarly be aware that user 48 is already wearing shoes 500 to Event X. This information may be received 302 via location services associated with wearable 49 being within a threshold distance from Event X, user 48 having "checked in" to Event X, wearables 49 of shoes 500 for both user 46 and user 48 being within a threshold proximity to each other, etc. In the example, outfit process 10 may determine that user 46 may not want to wear the same shoes as user 48 to Event X, and may send 304 user 46 (e.g., via text, email, display on a client electronic device, etc.) an electronic message that at least a portion of the outfit (e.g., are) is not recommended for wearing at the event since user 48 is wearing shoes 500 to Event X. As such, the indication of user 48 wearing (or planning to wear) shoes 500 may occur at various times (e.g., while user 46 is trying on shoes 500, while user 46 is headed to Event X, while user 46 is at Event X, or any time in between) without departing from the scope of the disclosure.

In some implementations, the information about the event may include an indication of an attendee of the event that was an attendee of a previous event where at least the portion of the outfit was worn by the user at the previous event. For instance, assume for example purposes only that user 46 has attended a previous event (e.g., Event Z), and wore dress 400, and further assume that user 48 also attended Event Z. In the example, outfit process 10 may receive 302 this information using the methods described above. Further assume that user 46 is contemplating wearing dress 400 to Event Y. In the example, since dress 400 is a formal dress, and Event Y is a formal event, outfit process 10 may determine that user 46 will not be overdressed if dress 400 is worn to Event Y; however, since user 48 may have seen user 46 wearing dress 400 at Event Y, outfit process 10 may determine that user 46 may not want to be seen (by user 48) wearing the same dress to two events, and may send 304 user 46 (e.g., via text, email, display on a client electronic device, etc.) an electronic message that at least a portion of the outfit (e.g., dress 400) is not recommended (e.g., appropriate) for wearing at Event Y.

Conversely, assume for example purposes only that user 46 has attended a previous event (e.g., Event Z), and wore dress 400, and further assume that user 48 did not attend Event Z. In the example, outfit process 10 may receive 302 this information using the methods described above. Further assume that user 46 is contemplating wearing dress 400 to Event Y. In the example, since dress 400 is a formal dress, and Event Y is a formal event, outfit process 10 may determine that user 46 will not be overdressed if dress 400 is worn to Event Y; however, since user 46 did wear the same dress at previous Event Z, outfit process 10 may send 304 user 46 (e.g., via text, email, display on a client electronic device, etc.) an electronic message that at least a portion of the outfit (e.g., dress 400) was worn at a previous event, but that it may still be recommended (e.g., appropriate) for wearing at Event Y since the likelihood is low that someone went to both Event Z and Event Y will recognize user 46 as wearing the same dress from Event Z.

In some implementations, and continuing with the above example, the recommendation may be based upon a social connection between user 46 and user 48. For example, if user 46 and user 48 are friends, family, or in the same social circles (e.g., as determined by outfit process 10 via social media contacts, email contacts, phone contacts, etc.), outfit process 10 may determine that user 46 may not want to be seen (by user 48) wearing the same dress to two events, and may send 304 user 46 (e.g., via text, email, display on a client electronic device, etc.) an electronic message that at least a portion of the outfit (e.g., dress 400) is not recommended (e.g., appropriate) for wearing at Event Y. Conversely, for example, if user 46 and user 48 are not friends, family, or in the same social circles, outfit process 10 may determine that user 46 may not care that user 48 sees user 46 wearing the same dress to two events, and may send 304 user 46 (e.g., via text, email, display on a client electronic device, etc.) an electronic message that at least a portion of the outfit (e.g., dress 400) is still recommended (e.g., appropriate) for wearing at Event Y.

In some implementations, the first wearable may be a master arbiter. For instance, assume for example purposes only that wearable 47 for dress 400 is the master arbiter. In the example, wearable 47 (via outfit process 10) may determine each wearable's assessments as noted above. For example, wearable 47 may determine whether the outfit goes together, which portions may need to be changed, whether at least a portion of the outfit may be appropriate for the venue, time of year, nature of the event, comfort level desired, etc., whether to wear at least a portion of the outfit for social reasons (e.g., friends wearing the same thing). In some implementations, wearable 47 as the master arbiter may be a predetermined focus of user 46. For example, outfit process 10 may receive (e.g., via a user interface associated with outfit process 10) an indication that user 46 wants dress 400 to be the focus of the entire outfit. Thus, in the example, wearable 47 (via outfit process 10) may determine which portions may need to be changed given that dress 400 is the focus of the entire outfit.

In some implementations, the electronic message sent 304 to user 46 may include other forms of alerts (recommendations). For example, the electronic message may be the wearable vibrating after a determination is made that user 48 and user 46 will be wearing the same shoes 500. As another example, the electronic message may be a light in a closet of user 46 indicating the location of another article(s) of clothing (e.g., with or without an associated wearable) that is recommended to be worn, or another colored light (e.g., red) in a closet of user 46 indicating the location of another article(s) of clothing (e.g., with or without an associated wearable) that is not recommended to be worn. In some implementations, if the closet light goes red, and user 46 feels this is wrong, user 46 may, e.g., via a user interface associated with outfit process 10, ask for more detailed information. For instance, the detailed information (which may also be included in the electronic message) may include, e.g., "that dress does not go with those shoes", "find a different pair of shoes for this outfit", "your friend Jenny is wearing the same boots", or other various expressions detailing the rationale. In some implementations, the detailed explanation may be more intuitive and aware of the comfort and use of the wearable as in, e.g., "you are wearing heels and you will be walking four miles during this event, maybe trade out the shoes for a more comfortable shoe". Other details may include, e.g., information around similar clothing items being worn, dissimilar formality levels ("Jean is wearing a cocktail dress, you are wearing boyfriend jeans, you should figure this out"), "Bob is wearing the same KENZO shirt tonight"), etc. "This event is apparently white tie, should you wear your suit?" Any combination of electronic messages may be used as well. As such, the description of sending an electronic message as text should be taken as an example only and not to limit the scope of the disclosure.

In some implementations, outfit process 10 may initiate a communication channel between user 46 and another user. For instance, assume for example purposes only that user 46 and user 48 are both known by outfit process 10 to be in the same social circles. In the example, if outfit process 10 determines that user 46 and user 48 are both wanting to wear shoes 500, outfit process 10 may send a message to both user 46 and user 48 to being a communication (e.g., voice/video chat or text) to discuss.

As noted above, various attribute information and/or event information may be used to send 304 recommendations. For instance, the various attribute information and/or event information may be from analysis of their match with other clothing choices, as well as analysis of friends' wearables, other considerations of weather, venue, appropriateness, etc. Another event attribute may be safety. For instance, assume for example purposes only that the outfit includes a wearable for a diamond earring. Further assume that wearable 47 sends a message to user 46 that, e.g., the event is in downtown; the history recorded by outfit process 10 indicates a likelihood that user 46 may take the subway to downtown events; the historical data shows that robberies are common on the subway at this area and time. In the example, outfit process 10 may recommend that user 46 wears some less expensive earrings. In some implementations, outfit process 10 may also identify what kids of clothing choices and accessories tend to either make people more liable to be robbed or which items they wear may be more likely targets.

In some implementations, outfit process 10 may execute a barter operation. For example, assume that user 46 and user 46 both want to wear shoes 500. In the example, outfit process 10 may perform a barter operation on the behalf of user 46 (with a similar process occurring with the wearable of user 48). After the operation is completed, outfit process 10 may send 304 a message to user 46 that user 46 has lost and should wear another dress recommended by outfit process 10; however, the message may also include a concession that user 46 may bring a clothing item of user 48 (e.g., a handbag).

In some implementations, relationships may be established by outfit process 10 among wearables similar to another piece of clothing or brand. For example, if T-shaped sandals are trending for this summer, outfit process 10 may identify 300 as an attribute a relationship showing what brands of T-shaped sandals are being worn with various types of jeans, skirts, dress or other outfit. As another example, identified 300 attributes of brands like Brand A or Brand B may be expensive. In the example, outfit process 10 may identify 300 as an attribute that these sandals may be worn with designer's dresses like Designer C or Designer D for dinners or other types of gathering. As another example, identified 300 attributes of brands like Brand F may be identified as an attribute of being relatively cheaper and made with rubber. In the example, outfit process 10 may identify 300 as an attribute that these sandals may be paired with a more causal outfit like Brand E shorts or Brand F jeans. In some implementations, once the relationships are established among different pieces of clothing by outfit process 10, the user may query outfit process 10 (via a user interface associated with outfit process 10) to ask what outfit (or portions thereof) may go with a piece of clothing (e.g., the above-noted focus of the outfit), who owns or has worn this piece of clothing before, or plans to wear this piece of clothing for the same event, etc. In the example, the message may be sent 304 after manually being asked by user 46, as opposed to automatically being sent 304.

It will be appreciated that while implementations are described with wearable 47 obtaining the appropriate information from other wearables with the arbitration logic to provide recommendations, other implementations are possible. For example, some or all of the event and/or attribute information from the wearables may be sent (e.g., directly and/or indirectly) to computer 12 (e.g., a central processor) and/or client electronic device 38, where the arbitration logic may be used by outfit process 10 to provide recommendations. As such, the description of wearable 47 obtaining the appropriate information from other wearables with the arbitration logic to provide recommendations should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
identifying attribute information of at least a first wearable associated with an outfit of a user including receiving, by the first wearable, attribute information from at least a second wearable associated with the outfit of the user, wherein each of the first wearable and the at least second wearable are computing devices embedded into a portion of an outfit;
receiving, via a user interface, an indication designating the first wearable as a master arbiter, wherein the master arbiter is a predetermined focus of the outfit and determines whether one or more portions of the outfit associated with the at least second wearable are recommended for wearing with a portion of the outfit associated with the master arbiter;
receiving information about an event; and
sending an electronic message when at least a portion of the outfit is not recommended for wearing at the event based upon, at least in part, the attribute information of the first wearable, the at least second wearable, and the information about the event.

2. The computer-implemented method of claim 1 wherein the information about the event is received from a social media website.

3. The computer-implemented method of claim 1 wherein the information about the event is received from a scheduling application.

4. The computer-implemented method of claim 1 wherein the information about the event includes an indication of an attendee of the event wearing at least the portion of the outfit to the event.

5. The computer-implemented method of claim 1 wherein the information about the event includes an indication of an attendee of the event that was an attendee of a previous event where at least the portion of the outfit was worn by the user at the previous event.

6. A computer program product residing on a non-transitory computer readable storage medium having a plurality of instructions stored thereon which, when executed by a processor, cause the processor to perform operations comprising:
identifying attribute information of at least a first wearable associated with an outfit of a user including receiving, by the first wearable, attribute information from at least a second wearable associated with the outfit of the user, wherein each of the first wearable and the at least second wearable are computing devices embedded into a portion of an outfit;
receiving, via a user interface, an indication designating the first wearable as a master arbiter, wherein the master arbiter is a predetermined focus of the outfit and determines whether one or more portions of the outfit associated with the at least second wearable are recommended for wearing with a portion of the outfit associated with the master arbiter;
receiving information about an event; and
sending an electronic message when at least a portion of the outfit is not recommended for wearing at the event based upon, at least in part, the attribute information of the first wearable, the at least second wearable, and the information about the event.

7. The computer program product of claim 6 wherein the information about the event is received from a social media website.

8. The computer program product of claim 6 wherein the information about the event is received from a scheduling application.

9. The computer program product of claim 6 wherein the information about the event includes an indication of an attendee of the event wearing at least the portion of the outfit to the event.

10. The computer program product of claim 6 wherein the information about the event includes an indication of an attendee of the event that was an attendee of a previous event where at least the portion of the outfit was worn by the user at the previous event.

11. A computing system including a processor and a memory configured to perform operations comprising:
identifying attribute information of at least a first wearable associated with an outfit of a user including receiving, by the first wearable, attribute information from at least a second wearable associated with the outfit of the user, wherein each of the first wearable and the at least second wearable are computing devices embedded into a portion of an outfit;
receiving, via a user interface, an indication designating the first wearable as a master arbiter, wherein the master arbiter is a predetermined focus of the outfit and determines whether one or more portions of the outfit associated with the at least second wearable are recommended for wearing with a portion of the outfit associated with the master arbiter;
receiving information about an event; and
sending an electronic message when at least a portion of the outfit is not recommended for wearing at the event based upon, at least in part, the attribute information of the first wearable, the at least second wearable, and the information about the event.

12. The computing system of claim 11 wherein the information about the event is received from a social media website.

13. The computing system of claim 11 wherein the information about the event includes an indication of an attendee of the event wearing at least the portion of the outfit to the event.

14. The computing system of claim 11 wherein the information about the event includes an indication of an attendee of the event that was an attendee of a previous event where at least the portion of the outfit was worn by the user at the previous event.

* * * * *